(12) United States Patent
Monteilliet

(10) Patent No.: US 7,754,311 B2
(45) Date of Patent: Jul. 13, 2010

(54) MULTILAYER CARD OF THERMOPLASTIC MATERIAL AND A METHOD OF MAKING THE MULTILAYER CARD SECURE

(75) Inventor: Gilles Monteilliet, Us (FR)

(73) Assignee: Sagem Securite, Paris (FR)

( * ) Notice: Subject to any disclaimer, the term of this patent is extended or adjusted under 35 U.S.C. 154(b) by 630 days.

(21) Appl. No.: 10/558,922

(22) PCT Filed: Jun. 2, 2004

(86) PCT No.: PCT/FR2004/001356

§ 371 (c)(1),
(2), (4) Date: Dec. 2, 2005

(87) PCT Pub. No.: WO2005/004048

PCT Pub. Date: Jan. 13, 2005

(65) Prior Publication Data

US 2007/0062629 A1    Mar. 22, 2007

(30) Foreign Application Priority Data

Jun. 5, 2003    (FR) .................................. 03 06780

(51) Int. Cl.
*B32B 3/24* (2006.01)

(52) U.S. Cl. ............... 428/139; 428/201; 428/203; 428/140; 283/107; 283/109; 156/261

(58) Field of Classification Search ............ 428/139, 428/203, 201, 140; 283/109, 107; 156/261
See application file for complete search history.

(56) References Cited

U.S. PATENT DOCUMENTS

| 4,313,984 | A |   | 2/1982  | Moraw et al. |
| 4,324,421 | A | * | 4/1982  | Moraw et al. ............... 283/75 |
| 4,356,052 | A | * | 10/1982 | Moraw et al. ............... 156/498 |
| 4,711,690 | A | * | 12/1987 | Haghiri-Tehrani ....... 156/309.6 |
| 6,146,032 | A | * | 11/2000 | Dunham ................ 400/120.18 |

FOREIGN PATENT DOCUMENTS

| EP | 0 488 574 A2 | 6/1992 |
| EP | 0 527 438 A2 | 2/1993 |

* cited by examiner

*Primary Examiner*—William P Watkins, III
(74) *Attorney, Agent, or Firm*—Muncy, Geissler, Olds & Lowe, PLLC

(57) ABSTRACT

The invention relates to a multilayer card of thermoplastic material comprising first and second layers (7, 2) secured to each other, together with least one reinforced bonding zone (9) between the first layer and the second layer. The invention also provides a method of making a multilayer card secure.

11 Claims, 1 Drawing Sheet

MULTILAYER CARD OF THERMOPLASTIC MATERIAL AND A METHOD OF MAKING THE MULTILAYER CARD SECURE

The present invention relates to a multilayer card of thermoplastic material usable in particular as a data medium. Such a card can serve, for example, to prove the identity of the card holder or to control access to premises. The invention also provides a method of making a multilayer card secure, e.g. a card usable as a data medium.

BACKGROUND OF THE INVENTION

Multilayer cards are known comprising a core layer, forming the body of the card, a printed layer on which the data appears and that extends over the core layer, and a transparent protective layer extending on the printed layer. The core layer and the protective layer are generally made of polyethylene terephthalate which is a material that withstands external aggression and that is relatively inexpensive. The printed layer is made of polyvinylchlroide which is a material that is particularly well adapted to printing.

Such a card is made by lamination. Unfortunately, with that method, the adhesion of the protective layer of polyethylene terephthalate on the printed layer of polyvinylchlroide is relatively weak so there exists a risk of an unauthorized person unsticking the protective layer from the printed layer in order to falsify the data that appears thereon.

To obviate that drawback, it is known to make a protective layer that is fragmented. The protective layer then cannot be withdrawn as a single piece, which makes it more difficult to remove and to put back into place. Unfortunately, such fragmentation also complicates manufacture of the card.

OBJECT OF THE INVENTION

An object of the invention is to propose means making it more difficult to falsify the data without excessively complicating manufacture of the card.

BRIEF SUMMARY OF THE INVENTION

To this end, the invention provides a multilayer card of thermoplastic material comprising first and second layers secured to each other, and at least one reinforced bonding zone between the first and second layers.

Thus, the reinforced bonding zone opposes unsticking of the two layers. Advantageously, the reinforced bonding presents mechanical strength that is greater than that of at least one of the layers. Thus, when an attempt is made at unsticking the layers, it is a layer that is damaged before the reinforced bonding gives way. Damage to the layer prevents it being put back into place and reveals the attempt at falsification.

In a particular embodiment, a third layer extends between the first and second layers, and the reinforced bonding zone extends through the third layer between the first and second layers.

Thus, while the bonding between the third layer and the first layer or the second layer is relatively weak after lamination, the reinforced bonding means establishes a direct connection between the first layer and the second layer.

Under such circumstances, the first and second layers are advantageously made of the same thermoplastic material or of materials suitable for being heat sealed together, and at least the first layer includes a portion that passes through the third layer and is heat sealed to a corresponding portion of the second layer.

The reinforced bonding is then implemented simply by heat sealing (i.e. welding).

Preferably, the card has at least two contiguous edges that form an angle between them, and the reinforced bonding zone is disposed in the vicinity of the intersection between the two edges.

In prior art cards having two contiguous edges, it is easier to unstick the two layers from each other starting from the intersection between the two edges. By positioning the reinforced bonding zone in the vicinity of the intersection between the two edges in the card of the invention, it is possible to limit possibilities for unsticking with a limited number of reinforced bonding zones.

The invention also provides a method of securing a multilayer card comprising at least first and second layers of thermoplastic material that are secured to each other by lamination, the method including the step of locally forming at least one additional bond between the first layer and the second layer.

Other characteristics and advantages of the invention appear on reading the following description of a particular, non-limiting embodiment of the invention.

BRIEF DESCRIPTION OF THE DRAWING

Reference is made to the accompanying drawing, in which.

DETAILED DESCRIPTION OF THE INVENTION

Figure 1:
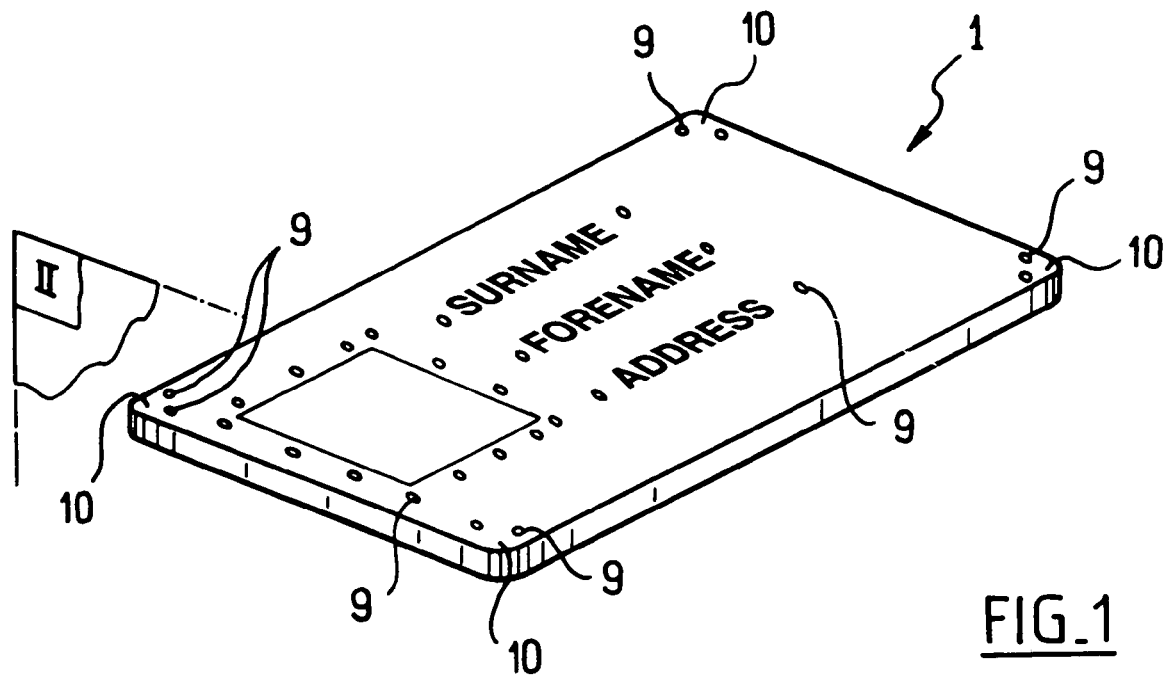
FIG. 1 is a perspective view of a card in accordance with the invention.
Figure 2:
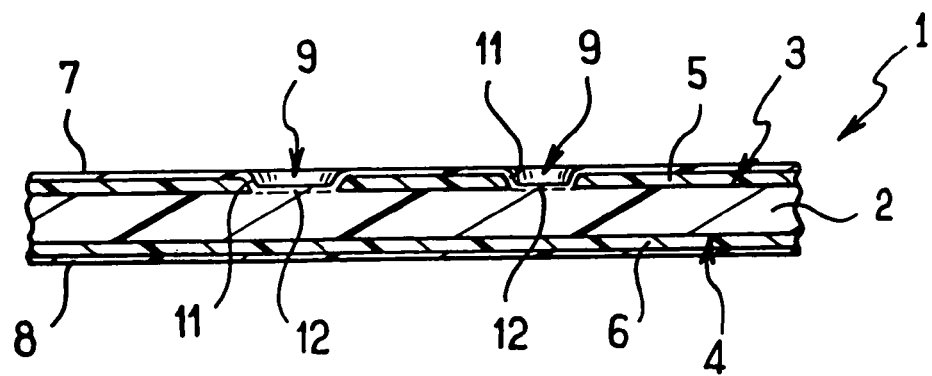
FIG. 2 is a fragmentary diagrammatic view on a larger scale of said card in section on plane II of FIG. 1.

The invention is described below in application to a card constituting a medium for carrying identity (ID) data of the card holder. Such a card can be used to verify identity or to control access to premises. The invention is also applicable to bank cards, telephone cards, or any other card that is to constitute a data medium.

The data may be printed on the card in a manner that is directly readable and/or may be contained in a magnetic track, an integrated circuit, or a bar code readable by dedicated reader means.

With reference to the figures, the card given overall reference 1 is a multilayer card of rectangular outline.

The card 1 comprises a core layer 2 of polyethylene terephthalate (PET) having faces 3 and 4 on which there extend printed layers 5 and 6 of polyvinylchlroide (PVC). Each printed layer 5, 6 is covered in a protective layer 7, 8 of polyethylene terephthalate.

On the faces 3, 4 of the core layer 2, there may be printed a pattern and general information relating, for example, to the body or the organization that issued the card.

On the printed card 7, there are printed, for example, personal details of the card holder, such as, in this case, surname, forenames, address, and a photograph or any other data enabling the holder to be identified. This layer may also have printed thereon information relating to the extent of the rights conferred by the card, an expiry date of the card, a security hologram, etc. On the printed layer 8, there are printed, for example, information concerning the organization that issued the card, or a bar code, or any other type of information.

The protective layers 7 and 8 withstand external attack and protect the information printed on the printed layers 5 and 6 against being deleted or altered by such attack.

The card 1 also includes reinforced bonding zones 9 extending through the printed layer 5 between the core layer 2 and the protective layer 7. In this example, the reinforced bonding zones 9 extend in the vicinity of the intersection 10 between contiguous edges of the card (i.e. at the four corners of the card 1), around the photograph, and over the surface as a whole of the card 1 in a regular distribution.

Each reinforced bonding zone 9 is constituted by a portion 11 of the protective layer 7 that has passed through the printed layer 5 and that is heat sealed to a corresponding portion 12 of the face 3 of the core layer 2.

The reinforced bonding zones 9 can be made during manufacture of the card or after the card has been manufactured, in the context of a process for making the card secure.

During manufacture of the card, the layers 2, 5, 6, 7, and 8 are laminated against one another in conventional manner to bond said layers together. The layers 2, 5, 6, 7, and 8 may be in the form of plates or strips having a plurality of card locations defined thereon, which locations are subsequently cut apart in order to produce individual cards. It is also possible to envisage unit manufacture. The layers 2, 5, and 6 are printed prior to lamination.

After lamination, the individualized card is made secure or a plurality of cards are made secure simultaneously.

The step of locally providing additional bonds between the core layer 2 and the protective layer 7 is then performed. The additional bonds are formed directly between the core layer 2 and the protective layer 7 through the printed layer 5. These additional bonds form the above-described reinforced bonding zones.

These bonds are implemented by heat sealing, by using a hot punch, so as to press the facing portions of the core layer 2 and of the protective layer 7 one against the other and weld them together. The welding parameters, in particular the temperature and the pressure, are selected so as to cause the printed layer 5 to soften in such a manner that the portions 10 and 11 for welding together can be brought into contact with each other through the printed layer 5 whose material is displaced out of the way by the pressure exerted by the hot punch.

It can be seen that this operation leaves plastic surface deformation in the outside face of the protective layer 7. The reinforced bonding zones 9 can then be organized to constitute a pattern that itself performs a security function. Similarly, the hot punch may present an imprint in the form of a seal for marking the outside face of the protective layer 7.

The method of the invention for making a card secure can be implemented on plates or strips combining a plurality of card locations, or on a laminated multilayer card that has already been made, for example.

Naturally, the invention is not limited to the embodiments described and variant embodiments can be applied thereto without going beyond the ambit of the invention as defined by the claims.

In particular, reinforced bonds may also be provided between the core layer 2 and the protective layer 8, or between internal layers of the card.

Furthermore, the number of layers in the card may be different from the number in the embodiment described. Thus, the invention applies equally to multilayer cards having a core layer 2 on which the information for protection is printed and covered directly by the protective layers.

In addition, the reinforced bonding may be implemented by heat sealing as described above, or by welding using ultrasound, a laser, friction, or chemically by means of solvents. It is also possible to use glue, or more generally an adhesive.

Furthermore, the materials used may be different from those described. For an embodiment relying on heat sealing, the materials of the core layer and of the protective layer could be different, providing they are suitable for being welded together.

It should be observed that the invention can be implemented symmetrically, and thus serve to protect information or data both on the front face and on the rear face of the card.

The invention claimed is:

1. A multilayer card of thermoplastic material comprising a protective layer and a core layer secured to each other and an intermediate layer extending between the protective layer and the core layer, the protective layer being the outermost layer of the card, the card including at least one reinforced bonding zone extending through the printed layer between the protective layer and the core layer, wherein said intermediate layer has printing on a surface of said intermediate layer next to said protective layer and said reinforced bonding zone is comprised of material from said protective layer.

2. A multilayer card according to claim 1, wherein the protective layer and the core layer are made of the same thermoplastic material or of thermoplastic materials that are weldable to each other, and at least the protective layer includes a portion passing through the printed layer and welded to a corresponding portion of the core layer.

3. A multilayer card according to claim 1, wherein the card includes at least two contiguous edges forming an angle between each other, and the reinforced bonding zone is located in the vicinity of the intersection between the two edges.

4. A method of making secure a multilayer card of thermoplastic material comprising at least a protective layer, an intermediate layer and a core layer that are bonded together by lamination, the intermediate layer extending between the protective layer and the core layer, the method including the step of locally forming at least one additional bond directly between the protective layer and the core layer after the layers have been laminated together, wherein said intermediate layer has printing on a surface of said intermediate layer next to said protective layer and said at least one additional bond is comprised of material from said protective layer.

5. A method according to claim 4, wherein the additional bond is made by welding by pressing and welding together facing portions of the protective layer and of the core layer.

6. A method according to claim 5, wherein the welding parameters are selected in such a manner as to cause the intermediate layer to soften in such a manner that the portions for welding together can be brought into contact with each other through the intermediate layer.

7. A method according to claim 5, wherein welding is performed in such a manner as to leave plastic deformation in the surface of an outside face of at least one of the protective layer and the core layer.

8. A multilayer card according to claim 1, wherein the reinforced bonding zone includes a plastic deformation on a surface of the card.

9. A multilayer card according to claim 1, wherein the reinforced bonding zone is a portion of the protective layer heat sealed to a corresponding portion of the core layer.

10. A method according to claim 4 wherein the at least one additional bond is formed by heat sealing using a hot punch.

11. A method according to claim 4, wherein the core layer and the protective layer are pressed together and welded.

* * * * *